Jan. 2, 1962   J. W. MEACHAM   3,015,795
BUSWAY POWER TAKE-OFF PLUG
Filed May 28, 1959

INVENTOR.
John W. Meacham
BY Robert H. Casey
ATTORNEY

United States Patent Office 3,015,795
Patented Jan. 2, 1962

3,015,795
BUSWAY POWER TAKE-OFF PLUG
John W. Meacham, Endwell, N.Y., assignor to General Electric Company, a corporation of New York
Filed May 28, 1959, Ser. No. 816,527
2 Claims. (Cl. 339—14)

My invention relates to electric power busway systems, and more particularly to electric power take-off plug devices for use with such systems.

The present invention relates to busway power systems of the type such as shown in my prior application, Serial No. 769,213, filed October 23, 1958, and assigned to the same assignee as the present invention. Busway systems of the type referred to include an elongated metallic housing and bus bar power conductors supported in insulated relation therein. Openings are provided in the housing at longitudinally spaced locations to receive the contacts of plug-in type power take-off devices. Such power take-off devices are of relatively substantial size and weight and require some means other than the electrical contacts to retain them on the busway housing. Such devices also require, in addition to the contacts for the power bus bars, a good electrical connection with the metallic housing of the busway.

In prior art busway power-take-off devices, retaining brackets are provided on the housing of the plug device, which must first be placed in proper position with respect to the busway housing, and then tightened. It is therefore necessary, in using such devices, to, (1) insert the device in mounted position on the busway housing, (2) place the supporting brackets in engaged position, and (3) tighten the supporting brackets. In addition, such prior art plug-in busway devices depend, for ground connection, on a connection between the supporting brackets and the busway plug housing. A wire-connecting means is mounted on the housing of the plug device for connecting a ground conductor thereto. The path of the ground circuit, therefore, is from the busway duct housing to the supporting bracket, to the housing of the plug device, to the ground connector, and thence to the ground conductor.

It is an object of the present invention to provide a busway power take-off device including supporting hanger or bracket means which become engaged with the duct housing automatically when the plug device is inserted in position on the duct, and means for thereafter tightening or clamping the hangers in place.

It is another object of the invention to provide a busway plug device which includes a ground-connecting path which does not depend upon the housing of the plug device as a portion of such path.

In accordance with the invention in one form, I provide a busway power take-off device including a housing, and a pair of opposed supporting brackets of resilient material mounted on the plug device and each including a hook-shaped retaining portion and a cam portion for moving the brackets apart as the device is mounted on the busway housing to permit the retaining portions to engage the housing, and means for adjusting the position of the resilient hangers with respect to the housing to tighten their hold on the housing after the device is mounted.

In accordance with another aspect of the invention, the resilient brackets are provided with electrical conductor connecting means, mounted directly on a portion of at least one of the brackets, whereby a ground conductor may be connected directly to the resilient bracket and thereby to the busway housing.

The invention will be more fully understood from the following detailed description, and its scope will be pointed out particularly in the appended claims.

Figure 1:
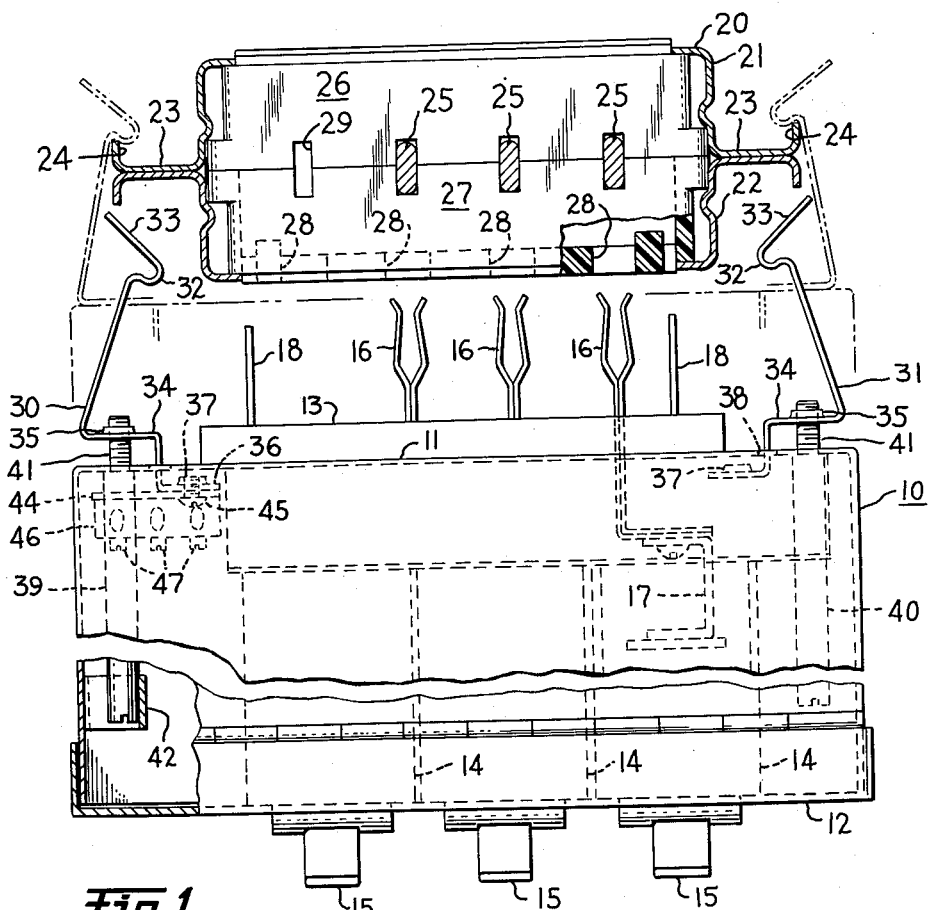
FIGURE 1 is a sectional elevation view of a busway power take-off plug device shown in displaced relation to a busway duct with which it is adapted to be used, the inserted position of a portion of the plug device being shown in dotted lines.
Figure 2:
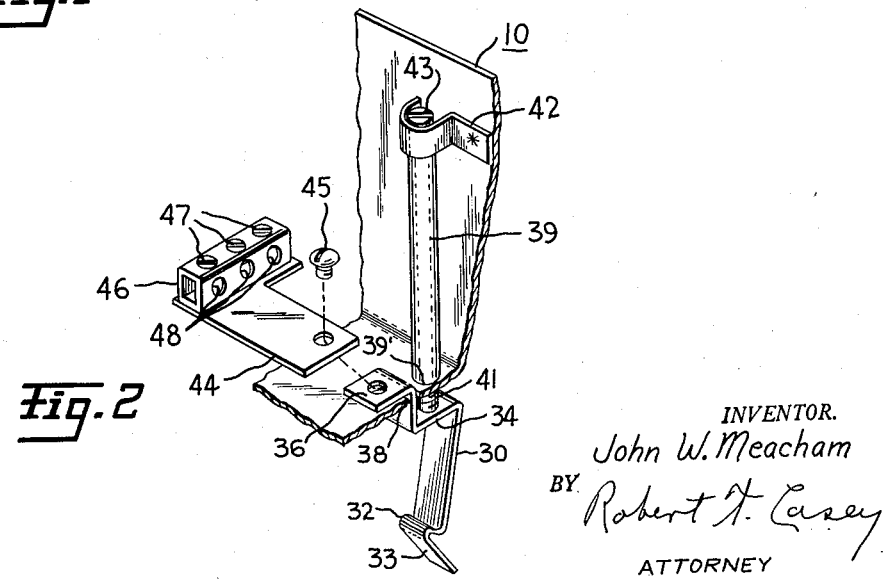
FIGURE 2 is a fragmentary perspective view of a portion of the plug device of FIGURE 1, showing particularly a resilient bracket and its associated ground connector.

Referring to the drawings more specifically, the invention is shown as incorporated in a busway power take-off plug device including a generally rectangular outer metallic enclosure 10 which is generally box-like in construction and includes a back wall 11, and an open front wall, closed by a removable cover 12. An insulating support 13 is mounted in an aperture in the back wall 11 by suitable means, such as by screws, not shown, and serves to support suitable electrical controlling means such as circuit breakers 14, having manually engageable handle portions 15 projecting through corresponding apertures in the front cover 12.

A plurality of plug-in type contacts 16 are mounted on the insulating support 13 and connected to the circuit breakers 14 by suitable connecting straps 17 (only one shown). For the purpose of guiding the plug device into properly aligned engagement with the busway housing, a pair of guide members 18 are also provided, mounted on the insulating support 13.

The power take-off plug device is shown as adapted for use with a power busway including an elongated generally rectangular metallic housing 20 including two similar generally U-shaped trough sections 21 and 22, having outwardly directed flange portions 23 terminating in outwardly flaring terminal flanges 24. The busway housing 20 includes a plurality of electric power bus bar conductors 25 supported in insulated relation therein by longitudinally spaced insulating supports (only one shown) each comprising two mating halves 26 and 27 provided with correspondingly positioned notches adapted to engage and support the power bus bar conductors 25. The housing halves 21 and 22, and the insulator halves 26 and 27 are provided with registering openings 28 adapted to permit the entry of the power take-off contacts 16 for engagement with the bus bar conductors 25. The busway illustrated also includes a pair of notches providing an opening 29 adapted to support a fourth bus bar conductor, which may be used in systems which require a neutral conductor.

For the purpose of supporting the power take-off device on the busway housing, there is provided a pair of generally hook-shaped supporting brackets 30 and 31 of relatively thin strip resilient material, each having an intermediate inwardly directed projection 32 and an outwardly directed "cam" portion 33. The resilient brackets 30 and 31 each include a base portion 34 having a tapped aperture 35 therein, and an offset generally L-shaped base extension 36 having a tapped aperture 37 therein and extending within the housing 10 of the plug device through an aperture 38. The resilient brackets 30 and 31 are supported with respect to the enclosure 10 by means of supporting posts 39 and 40, each having a reduced threaded portion 41 projecting through an aperture in the back wall 11 of the enclosure 10 and into threaded engagement in the tapped aperture 35 of the brackets 30 and 31 respectively. The supporting posts 39 and 40 are further retained in position in the enclosure 10 by means of retaining brackets 42 attached to the side wall of the enclosure 10 by suitable means such as by welding, and are provided with a slot 43 in the inner end portion to permit turning with a screwdriver.

The resilient supporting bracket 30 is also provided at its inwardly projecting end 36 with means for connecting one or more ground conductors thereto. In the disclosed form of the invention, a supporting conducting plate 44 is mounted on the inwardly projecting portion 36 of the bracket 30 by suitable means, such as by a screw 45, and serves to support a plural wire-connecting means including a generally rectangular tubular member 46, having tapped apertures and clamping screws 47 therein, and corresponding wire-receiving apertures 48. The tubular member 46 is supported on the plate 44 by suitable means such as by screws, not shown. It will be readily apparent that, if desired, a single or multiple connector may be mounted directly on the inwardly projecting portion 36, and the plate 44 omitted.

When the plug device is assembled and ready for initial use, the supporting posts 39 and 40 are threaded only part way into the resilient supporting brackets 30 and 31, thereby spacing the brackets a substantial distance away from the back wall 11 of the enclosure 10. In installing, the user merely pushes the plug device upwardly against the power busway duct, at a location where the contacts 16 can enter openings 28. As this is done, the outwardly directed cam portions 33 of the brackets engage the flanges 24 of the busway duct, forcing the brackets apart. As this inserting action is completed, the resilient brackets 30 and 31 snap inwardly over the flanges 24, as shown in dotted lines in FIGURE 1, thereby retaining the plug device in position on the busway duct. This frees the installer's hands so that he may thereafter easily tighten the supporting posts 39 and 40 with a screwdriver, drawing the resilient supports 30 and 31 toward the back wall 11 and clamping the device tightly against the housing of the busway duct. When this installing action is completed, the user may then connect his load wires to corresponding terminals (not shown) of the circuit breakers 14, and may connect corresponding ground wires from each of such loads to the ground connector 46 by inserting them in the apertures 48 and tightening the screws 47.

It will be observed that a dependable ground connection is thereby provided from the metallic enclosure 20 of the busway duct, through the resilient supporting bracket 30, directly to the terminal connector 46 and to the user's ground conductors, without involving the metallic enclosure 10 of the power take-off device as a part of this ground path. At the same time, the metallic enclosure 10 is itself grounded by reason of the connection between the resilient supporting bracket 30 and the supporting post 39 which in turn bears tightly against the inner surface of the back wall 11 at the shoulder 39' formed at the termination of the reduced portion 41.

It will therefore be observed that there is provided, in accordance with the invention, a busway power take-off plug device which may be easily and safely installed, which may be securely tightened in position after initial installation by the use of both hands if necessary, and which includes a dependable and direct ground connection from the housing of the busway duct to the user's ground conductors. It will, of course, be apparent that many modifications may be made without departing from the invention, and I therefore intend, by the appended claims, to cover all such modifications as fall within the true spirit and scope of the invention.

What I claim as new and desire to secure by Letters Patent of the United States is:

1. A busway power take-off device including a generally rectangular metallic enclosure having side walls, a front wall, and a back wall for mounting adjacent a busway housing; at least one resilient supporting bracket on the back wall of said enclosure, said supporting bracket including an inwardly directed portion for engaging an external surface portion of said busway housing to retain said device on said housing, said bracket having a portion adjacent the back wall of said enclosure turned parallel to said back wall with a threaded opening therethrough and a further portion extending from said parallel portion into the interior of said enclosure through an aperture therein, the back wall of said enclosure having an unthreaded opening aligned with the threaded opening in said bracket, means for supporting and adjustably positioning said supporting bracket with respect to said housing including an elongated supporting rod of electrically conducting material carried by and within said enclosure abutting said back wall and parallel to a side wall thereof, said electrically conducting rod having a threaded end portion of reduced diameter extending through said unthreaded opening and engaging the threaded opening in said bracket, the end of said rod opposite said threaded end extending into proximity with the front wall of said enclosure for adjustment, and means carried by said bracket adjacent the back wall of said enclosure for connection of a ground conductor thereto.

2. A busway power take-off device including a generally rectangular metallic enclosure having side walls, a front wall, and a back wall for mounting adjacent a busway housing; a pair of independent resilient supporting brackets on the back wall of said enclosure, said brackets including hook-shaped retaining portions for engaging external surface portions of said busway housing to retain said device on said housing, and including cam portions engageable with portions of said busway housing to move said hook-shaped portions away from each other as said device is mounted on said housing, each of said brackets having a threaded opening adjacent the back wall of said enclosure, a pair of threaded electroconductive bolts within said enclosure extending generally perpendicular to said back wall and having threaded ends engaging said threaded openings and actuatable ends adjacent said front wall accessible for actuation, means on said enclosure for retaining said bolts and the associated parts of the brackets against lateral movement relative to said enclosure, and means carried by one of said brackets for connection of a ground conductor thereto, said device being mounted on said busway housing by effecting relative movement between the device and housing in a direction parallel to the bolt axes.

References Cited in the file of this patent
UNITED STATES PATENTS

| | | |
|---|---|---|
| 1,835,251 | Wetstein | Dec. 8, 1931 |
| 2,113,328 | Makenny | Apr. 5, 1938 |
| 2,444,648 | Jackson et al. | July 6, 1948 |
| 2,720,632 | Stieglitz | Oct. 11, 1955 |
| 2,725,541 | Born et al. | Nov. 29, 1955 |
| 2,907,839 | Carlson et al. | Oct. 6, 1959 |